United States Patent
Wu

(10) Patent No.: US 10,492,108 B2
(45) Date of Patent: Nov. 26, 2019

(54) DEVICE AND METHOD OF HANDLING TRANSFERRING OF A STATE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/910,025

(22) Filed: Mar. 2, 2018

(65) Prior Publication Data
US 2018/0255484 A1 Sep. 6, 2018

Related U.S. Application Data

(60) Provisional application No. 62/466,379, filed on Mar. 3, 2017.

(51) Int. Cl.
*H04W 36/00* (2009.01)
*H04W 76/27* (2018.01)
(Continued)

(52) U.S. Cl.
CPC ...... *H04W 36/0016* (2013.01); *H04B 7/0413* (2013.01); *H04B 7/0617* (2013.01);
(Continued)

(58) Field of Classification Search
CPC . H04W 76/27; H04W 76/14; H04W 52/0216; H04W 76/10; H04W 76/12; H04W 68/02; H04W 68/025; H04W 76/15; H04W 76/19; H04M 1/2535; H04M 2203/655; H04M 7/006; Y02D 70/24;
(Continued)

(56) References Cited

U.S. PATENT DOCUMENTS

2004/0203623 A1 10/2004 Wu
2005/0250529 A1 11/2005 Funnell
(Continued)

FOREIGN PATENT DOCUMENTS

CN 105657861 A 6/2016
WO 2015/085273 A1 6/2015

OTHER PUBLICATIONS

3GPP TSG-RAN WG2 Meeting #97 R2-1702421 Athens, Greece, Feb. 13-17, 2017.
(Continued)

*Primary Examiner* — Fred A Casca
(74) *Attorney, Agent, or Firm* — Winston Hsu

(57) ABSTRACT

A communication device for handling transferring of a state comprises a processing circuit configured to execute instructions of: entering a RRC_CONNECTED state of a radio resource control (RRC) layer; receiving a first RRC message from the network in the RRC_CONNECTED state, wherein the first RRC message configures the communication device to enter a RRC_INACTIVE state of the RRC layer; entering the RRC_INACTIVE state in response to the first RRC message; initiating a RRC procedure or a data transmission in the RRC_INACTIVE state via a first cell of the network, wherein the RRC procedure is used for the communication device to enter the RRC_CONNECTED state; performing a cell selection/reselection to a second cell of the network, when initiating the RRC procedure; and keeping being in the RRC_INACTIVE state.

19 Claims, 3 Drawing Sheets

(51) Int. Cl.
*H04W 36/30* (2009.01)
*H04W 64/00* (2009.01)
*H04W 60/04* (2009.01)
*H04W 74/08* (2009.01)
*H04B 7/06* (2006.01)
*H04L 5/00* (2006.01)
*H04L 5/22* (2006.01)
*H04W 16/24* (2009.01)
*H04B 7/0413* (2017.01)

(52) U.S. Cl.
CPC ......... *H04B 7/0697* (2013.01); *H04L 5/0007* (2013.01); *H04L 5/22* (2013.01); *H04W 16/24* (2013.01); *H04W 36/30* (2013.01); *H04W 60/04* (2013.01); *H04W 64/006* (2013.01); *H04W 74/0833* (2013.01); *H04W 76/27* (2018.02)

(58) Field of Classification Search
CPC ............... Y02D 70/00; Y02D 70/1262; Y02D 70/1242; Y02D 70/126; Y02D 70/21; Y02D 70/1224; Y02D 70/146; Y02D 70/1264; Y02D 70/142; Y02D 70/1222; H04L 5/0048; H04B 17/382
USPC ...... 455/404.2, 450, 458, 435.1, 404.1, 418, 455/422.1; 370/329
See application file for complete search history.

(56) References Cited

U.S. PATENT DOCUMENTS

| | | | |
|---|---|---|---|
| 2007/0019643 A1* | 1/2007 | Shaheen | H04W 60/00 370/389 |
| 2010/0291941 A1 | 11/2010 | Chen | |
| 2012/0189016 A1* | 7/2012 | Bakker | H04W 76/11 370/401 |
| 2013/0329637 A1 | 12/2013 | Kodali | |
| 2014/0038607 A1 | 2/2014 | Makharia | |
| 2015/0043403 A1 | 2/2015 | Martinez Tarradell | |
| 2016/0309379 A1* | 10/2016 | Pelletier | H04W 76/27 |
| 2018/0206080 A1* | 7/2018 | Chen | H04W 4/06 |
| 2018/0234941 A1* | 8/2018 | Kim | H04W 68/005 |
| 2018/0279204 A1* | 9/2018 | Kim | H04W 48/02 |

OTHER PUBLICATIONS

3GPP TS 24.301 V14.2.0 (Dec. 2016) Technical Specification 3rd Generation Partnership Project; Technical Specification Group Core Network and Terminals; Non-Access-Stratum (NAS) protocol for Evolved Packet System (EPS); Stage 3 (Release 14).

Search Report dated Jul. 4, 2018 for EP application No. 18159760.0, pp. 1-7.

Ericsson, "Mobility between LTE and NR for inactive UEs", 3GPP TSG-RAN WG2 #97, Tdoc R2-1700874, Feb. 13-17, 2017, Athens, Greece, XP051211654, pp. 1-5.

Ericsson, "TP on inter-RAT inactive mobility", 3GPP TSG-RAN WG2 #97, Tdoc R2-1702425, Feb. 13-17, 2017, Athens, Greece, XP051237398, pp. 1-3.

Qualcomm Incorporated, "UE mobility while in RRC inactive mode—SA2 aspects", SA WG2 Meeting #119, S2-170917, Feb. 13-17, 2017, Dubrovnik, Croatia, XP051217037, pp. 1-6.

Office action dated Sep. 13, 2018 for the Taiwan application No. 107107308, filed Mar. 5, 2018, pp. 1-6.

* cited by examiner

DEVICE AND METHOD OF HANDLING TRANSFERRING OF A STATE

CROSS REFERENCE TO RELATED APPLICATIONS

This application claims the benefit of U.S. Provisional Application No. 62/466,379 filed on Mar. 3, 2017, which is incorporated herein by reference.

BACKGROUND OF THE INVENTION

1. Field of the Invention

The present invention relates to a device and a method used in a wireless communication system, and more particularly, to a device and a method of handling transferring of a state.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include a mobility management and a Quality of Service (QoS) control for the UE.

SUMMARY OF THE INVENTION

The present invention therefore provides a communication device and method for handling transferring of a state to solve the abovementioned problem.

A communication device for handling transferring of a state comprises a storage device and a processing circuit coupled to the storage device. The storage device stores, and the processing circuit is configured to execute instructions of: entering a RRC_CONNECTED state of a radio resource control (RRC) layer; receiving a first RRC message from the network in the RRC_CONNECTED state of the RRC layer, wherein the first RRC message configures the communication device to enter a RRC_INACTIVE state; entering the RRC_INACTIVE state in response to the first RRC message; initiating a RRC procedure or a data transmission in the RRC_INACTIVE state via a first cell of the network, wherein the RRC procedure is used for the communication device to enter the RRC_CONNECTED state; performing a cell selection/reselection to a second cell of the network, when initiating the RRC procedure; and keeping being in the RRC_INACTIVE state in response to the cell selection/reselection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
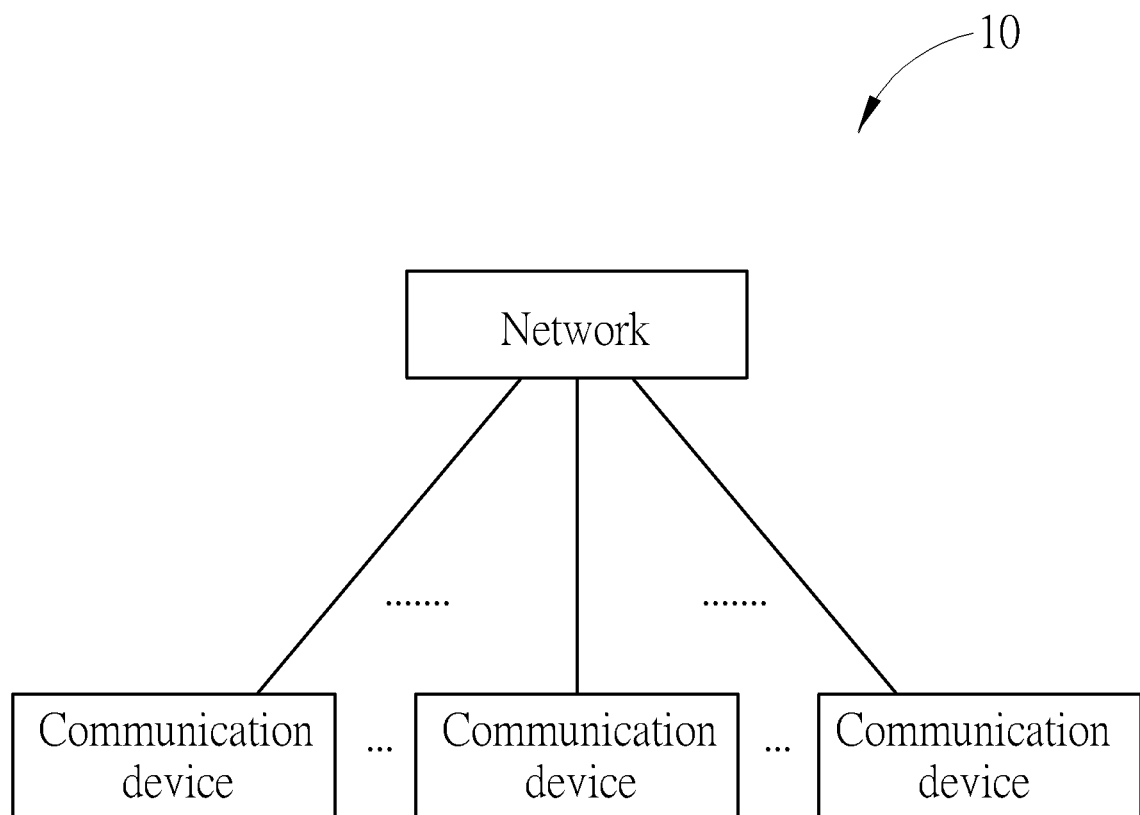
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device communicate with each other via one or more cells on one or more carriers of licensed band(s) and/or unlicensed band(s). The one or more cells maybe operated in the same or different frame structure types, or in the same or different duplexing modes, i.e. frequency-division duplexing (FDD) and time-division duplexing (TDD).

In FIG. 1, the network and the communication devices are simply utilized for illustrating the structure of the wireless communication system 10. The network may include a radio access network (RAN) including at least one base station (BS). Practically, the RAN may be an evolved universal terrestrial radio access network (E-UTRAN) including at least one evolved Node-B (eNB). The RAN may be a fifth generation (5G) network (or called new radio (NR) network) including at least one 5G BS (e.g., gNB) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS. Furthermore, the network may also include a core network which includes network entities connecting to the RAN.

A communication device may be a user equipment (UE), a narrowband Internet of Things (NB-IoT) UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
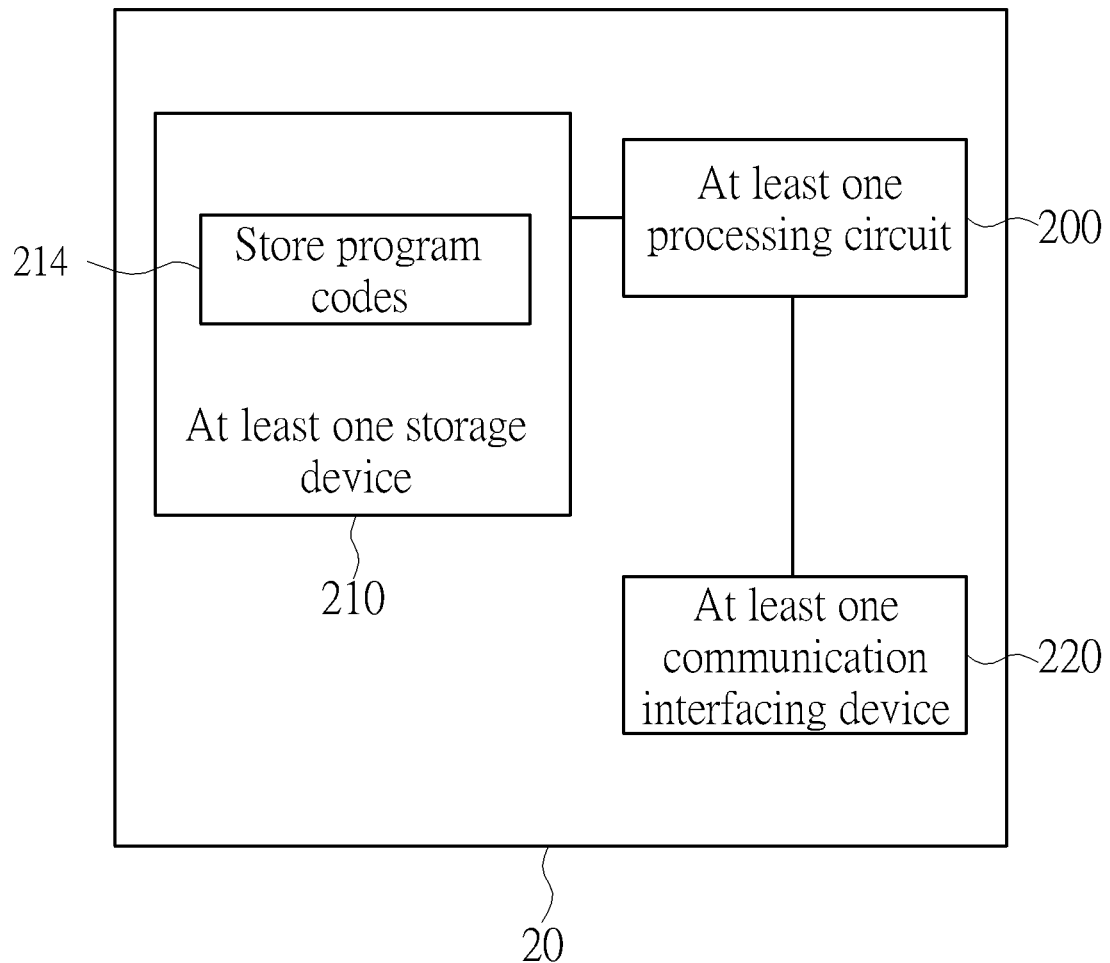
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as microprocessor(s) or Application Specific Integrated Circuit(s) (ASIC(s)), at least one storage device 210 and at least one communication interfacing device 220. The at least one storage device 210 may include any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

A UE may be configured by a network (e.g., a BS) to enter a RRC_INACTIVE state. To simplify the following description, the RRC_INACTIVE state may represent either a RRC_CONNECTED state with a light radio resource control (RRC) connection in the LTE system or a RRC_INACTIVE state in the NR system (i.e., 5G). Unless explicitly specified, the RRC_CONNECTED state is without the light RRC connection.

When a UE camps on a first cell, the UE in the RRC_INACTIVE state initiates a RRC procedure (e.g., RRC connection resume procedure) to enter the RRC_CONNECTED state. During the RRC procedure, the UE may select or reselect a second cell, i.e., may perform a cell selection/reselection to the second cell. A RRC layer of the UE may indicate "RRC connection failure" to a non-access stratum (NAS) layer of the UE. The UE may perform a (combined) tracking area update procedure due to the RRC connection failure to recover a NAS signaling connection. However, this recovery is not necessary. In the tracking area update procedure, transmission of a tracking area update request message and reception of a tracking area update accept message cause extra power consumption. In addition, the UE unnecessarily transfers from the RRC_INACTIVE state to the RCC_IDLE state. This introduces more latency for transferring to the RRC_CONNECTED state from the RCC_IDLE state than from the RRC_INACTIVE state. A similar problem may occur to the UE that the UE in the RRC_INACTIVE state performs a cell selection/reselection to the second cell while the UE in the RRC_INACTIVE state performs data transmission.

In the following embodiments, a UE is used to represent a communication device in FIG. 1, to simplify the illustration of the embodiments.

Figure 3:
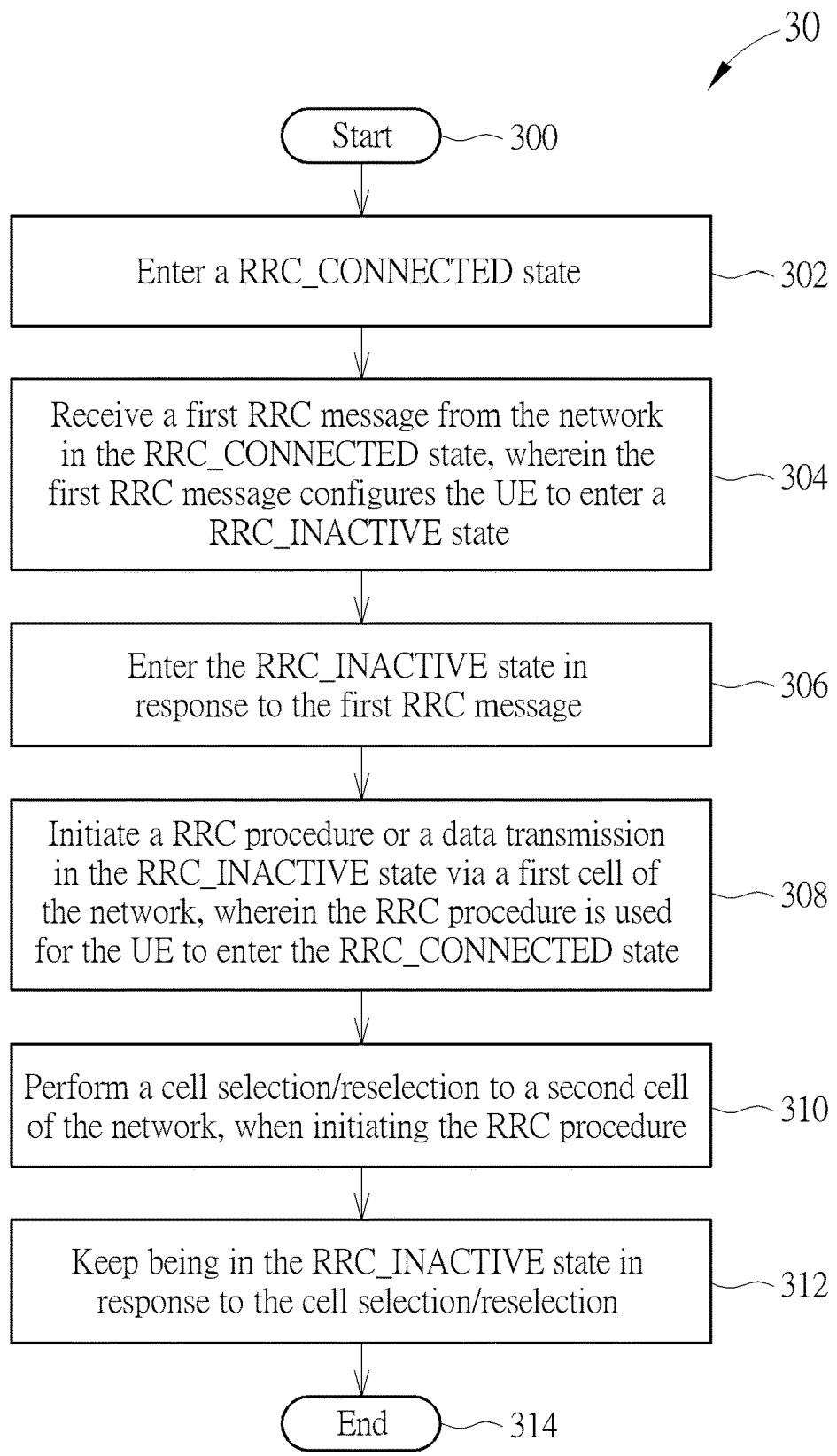
FIG. 3 is a flowchart of a process according to an example of the present invention.

A process 30 in FIG. 3 may be utilized in a UE, and includes the following steps:

Step 300: Start.

Step 302: Enter a RRC_CONNECTED state of a RRC layer.

Step 304: Receive a first RRC message from the network in the RRC_CONNECTED state, wherein the first RRC message configures the UE to enter a RRC_INACTIVE state of the RRC layer.

Step 306: Enter the RRC_INACTIVE state in response to the first RRC message.

Step 308: Initiate a RRC procedure or a data transmission in the RRC_INACTIVE state via a first cell of the network, wherein the RRC procedure is used for the UE to enter the RRC_CONNECTED state.

Step 310: Perform a cell selection/reselection to a second cell of the network, when initiating the RRC procedure.

Step 312: Keep being in the RRC_INACTIVE state in response to the cell selection/reselection.

Step 314: End.

According to the process 30, the UE enters a RRC_CONNECTED state of a RRC layer. The UE in the RRC_CONNECTED state receives a first RRC message from the network (e.g., RAN or BS), wherein the first RRC message configures the UE to enter a RRC_INACTIVE state of the RRC layer. The UE enters the RRC_INACTIVE state in response to the first RRC message. The UE in the RRC_INACTIVE state initiates a RRC procedure via a first cell of the network, wherein the RRC procedure is used for the UE to enter the RRC_CONNECTED state. The UE performs a cell selection/reselection (or the data transmission) to a second cell of the network, when (e.g., while) initiating the RRC procedure. The UE keeps being in the RRC_INACTIVE state in response to the cell selection/reselection. That is, the UE does not transfer from the RRC_INACTIVE state to another state even if the cell selection/reselection is performed. Thus, latency caused by state transferring and power consumption of the communication device are improved.

Realization of the processes above is not limited to the above description. The following examples may be applied to the processes above.

In one example, when initiating the RRC procedure, the UE transmits a RRC request message of the RRC procedure via the first cell to the network. Before the UE receives a RRC response message of the RRC procedure in response to the RRC request message, the UE selects/reselects the second cell. The UE keeps itself in the RRC_INACTIVE state in response to the cell selection/reselection.

In one example, when initiating the RRC procedure, the UE has not transmitted a RRC request message and performs the cell selection/reselection. The UE keeps itself in the RRC_INACTIVE state in response to the cell selection/reselection.

In one example, the RRC request message is a RRCConnectionResumeRequest message, and the RRC response message is a RRCConnectionResume message.

In one example, the UE initiates the data transmission to transmit an application data, e.g., an Internet Protocol (IP) packet or a short message.

In one example, to transmit the RRC request message or the IP packet, the UE may perform a random access (RA) procedure by transmitting a RA preamble to the network. The UE may transmit the RRC request message or an IP packet together with the RA preamble. The UE transmit the RRC request message or the IP packet, before or after receiving a RA response responding to the RA preamble from the network. The UE transmit the RRC request message or the IP packet using a UL grant in the RA response.

In one example, the UE may transmit the RRC request message or the IP packet directly without performing the RA procedure. That is, the UE does not transmit the RA preamble, and directly transmit the RRC request message or the IP packet in a time-frequency resource which may be configured by the network or may be predetermined by the UE.

In one example, the UE receives system information broadcasted by the second cell. In one example, the instruction of keeping being in the RRC_INACTIVE state in response to the cell selection/reselection comprises keeping being in the RRC_INACTIVE state when the second cell indicates that the second cell supports the RRC_INACTIVE state in the system information. The UE enters the RCC_IDLE state, when the second cell indicates that the second cell does not support the RRC_INACTIVE state in the system information. In one example, the system information comprises a system information block (SIB).

In one example, the UE enters a MM-CONNECTED mode of a Mobility Management (MM) layer of the UE, when entering the RRC_CONNECTED state of a RRC layer of the UE. The UE keeps itself in the MM-CONNECTED mode when entering the RRC_INACTIVE state in response to the first RRC message. The UE keeps itself in the MM-CONNECTED mode in response to the cell selection/reselection. In one example, the instruction of keeping being in the MM-CONNECTED mode in response to the cell selection/reselection comprises keeping being in the MM-CONNECTED mode when the second cell indicates that the second cell supports the RRC_INACTIVE state in the system information.

In one example, the UE receives system information broadcasted by the second cell. Then, the UE does not initiate a tracking area update procedure, when the second cell indicates that the second cell supports the RRC_INACTIVE state in the system information and the first cell and the second cell belong to the same tracking area. The UE initiates the tracking area update procedure, when the second cell indicates that the second cell does not support the RRC_INACTIVE state in the system information. In one example, the system information comprises a SIB. In one example, a RRC layer of the UE sends a first indication indicating "RRC connection failure" to a MM layer of the UE in response to the cell selection/reselection, when the UE performs the cell selection/reselection to the second cell and the second cell does not support the RRC_INACTIVE state. Thus, the MM layer initiates the tracking area update procedure. In one example, the RRC layer does not send the first indication indicating "RRC connection failure" to the MM layer in response to the cell selection/reselection, when the UE performs the cell selection/reselection to the second cell and the second cell supports the RRC_INACTIVE state. Thus, the MM layer is not triggered by the first indication to initiate the tracking area update procedure (e.g., transmit a tracking area update request message). In one example, the RRC layer may send a second indication indicating occurrence of a cell selection/reselection or a change of a cell, to the MM layer. The MM layer is not triggered by the second indication to initiate the tracking area update procedure.

In one example, the RRC layer is an evolved universal terrestrial radio access (E-UTRA) RRC layer or a NR RRC layer. In one example, the MM layer is an Evolved Packet System (EPS) MM layer or a NextGen (e.g., Next Generation or 5G/NR Core) MM layer.

In one example, the first RRC message indicates the UE to enter the RRC_INACTIVE state and includes a RAN paging area.

In one example, the RAN transmits information of the RAN paging area to a core network (CN), when the RAN configures the UE to enter the RRC_INACTIVE state. That is, the CN receives the information of the RAN paging area from the RAN.

In one example, the RAN receives the information of the RAN paging area from the CN before transmitting the first RRC message to the UE.

In one example, the UE may keep being in the RRC_INACTIVE state in response to the cell selection/reselection, when the first cell and the second cell belong to the same radio access technology (RAT) (e.g. NR or E-UTRA). The UE may change to a RCC_IDLE state of the RRC layer in response to the cell selection/reselection, when the first cell and the second cell belong to different RATs. The UE may change to a MM_IDLE state of the MM layer in response to the cell selection/reselection, when the first cell and the second cell belong to different RATs. For example, the first cell may be a NR cell and the second cell maybe an E-UTRA cell or a universal terrestrial radio access (UTRA) cell.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling transferring of a state. Thus, latency caused by state transferring and power consumption of the communication device are improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling transferring of a state, comprising:
   a storage device; and
   a processing circuit, coupled to the storage device, wherein the storage device stores, and the processing circuit is configured to execute instructions of:
   entering a RRC_CONNECTED state of a radio resource control (RRC) layer;
   receiving a first RRC message from a network in the RRC_CONNECTED state, wherein the first RRC message configures the communication device to enter a RRC_INACTIVE state of the RRC layer;
   entering the RRC_INACTIVE state in response to the first RRC message;
   initiating a RRC procedure or a data transmission in the RRC_INACTIVE state via a first cell of the network, wherein the RRC procedure is used for the communication device to enter the RRC_CONNECTED state;
   performing a cell selection/reselection to a second cell of the network, when initiating the RRC procedure;
   keeping being in the RRC_INACTIVE state in response to the cell selection/reselection during the RRC procedure, when the second cell indicates that the second cell supports the RRC_INACTIVE state in system information; and
   the RRC layer indicating "RRC connection failure" to a non-access stratum (NAS) layer of the communication device in response to the cell selection/reselection during the RRC procedure.

2. The communication device of claim 1, wherein the instructions further comprise:
   transmitting a RRC request message of the RRC procedure via the first cell to the network, when initiating the RRC procedure; and
   selecting/reselecting the second cell, before receiving a RRC response message of the RRC procedure in response to the RRC request message.

3. The communication device of claim 2, wherein the RRC request message is a RRCConnectionResumeRequest message, and the RRC response message is a RRCConnectionResume message.

4. The communication device of claim 2, wherein the communication device transmits the RRC request message without performing a random access (RA) procedure.

5. The communication device of claim 1, wherein the communication device initiates the data transmission to transmit an application data.

6. The communication device of claim 1, wherein the instructions further comprise:
   entering the RRC_IDLE state, when the second cell indicates that the second cell does not support the RRC_INACTIVE state in system information.

7. The communication device of claim 1, wherein the instructions further comprise:
   the RRC layer of the communication device sending an indication indicating "RRC connection failure" to a Mobility Management (MM) layer of the communication device in response to the cell selection/reselection, when the communication device performs the cell selection/reselection to the second cell and the second cell does not support the RRC_INACTIVE state; and the RRC layer of the communication device not sending the indication indicating "RRC connection failure" to the MM layer in response to the cell selection/reselection, when the communication device performs the cell selection/reselection to the second cell and the second cell supports the RRC_INACTIVE state.

8. The communication device of claim 1, wherein the instructions further comprise:

not initiating a tracking area update procedure, when the second cell indicates that the second cell supports the RRC_INACTIVE state in system information and the first cell and the second cell belong to a same tracking area; and initiating the tracking area update procedure, when the second cell indicates that the second cell does not support the RRC_INACTIVE state in the system information.

9. The communication device of claim 1, wherein the RRC layer is an evolved universal terrestrial radio access (E-UTRA) RRC layer or a new radio (NR) RRC layer.

10. A communication device for handling transferring of a state, comprising:

a storage device; and a processing circuit, coupled to the storage device, wherein the storage device stores, and the processing circuit is configured to execute instructions of:

entering a RRC_CONNECTED state of a radio resource control (RRC) layer;

receiving a first RRC message from a network in the RRC_CONNECTED state, wherein the first RRC message configures the communication device to enter a RRC_INACTIVE state of the RRC layer;

entering the RRC_INACTIVE state in response to the first RRC message;

initiating a RRC procedure or a data transmission in the RRC_INACTIVE state via a first cell of the network, wherein the RRC procedure is used for the communication device to enter the RRC_CONNECTED state;

performing a cell selection/reselection to a second cell of the network, when initiating the RRC procedure;

keeping being in the RRC_INACTIVE state in response to the cell selection/reselection;

entering a MM-CONNECTED mode of a Mobility Management (MM) layer of the communication device, when entering the RRC_CONNECTED state;

keeping being in the MM-CONNECTED mode, when entering the RRC_INACTIVE state in response to the first RRC message; and keeping being in the MM-CONNECTED mode in response to the cell selection/reselection.

11. The communication device of claim 10, wherein the instructions further comprise:

transmitting a RRC request message of the RRC procedure via the first cell to the network, when initiating the RRC procedure; and selecting/reselecting the second cell, before receiving a RRC response message of the RRC procedure in response to the RRC request message.

12. The communication device of claim 11, wherein the RRC request message is a RRCConnectionResumeRequest message, and the RRC response message is a RRCConnectionResume message.

13. The communication device of claim 11, wherein the communication device transmits the RRC request message without performing a random access (RA) procedure.

14. The communication device of claim 10, wherein the communication device initiates the data transmission to transmit an application data.

15. The communication device of claim 10, wherein the instruction of keeping being in the MM-CONNECTED mode in response to the cell selection/reselection comprises:

keeping being in the MM-CONNECTED mode in response to the cell selection/reselection, when the second cell indicates that the second cell supports the RRC_INACTIVE state in system information.

16. The communication device of claim 10, wherein the MM layer is an Evolved Packet System (EPS) MM layer or a NextGen MM layer.

17. The communication device of claim 10, wherein the instructions further comprise:

the RRC layer of the communication device sending an indication indicating "RRC connection failure" to the MM layer of the communication device in response to the cell selection/reselection, when the communication device performs the cell selection/reselection to the second cell and the second cell does not support the RRC_INACTIVE state; and the RRC layer of the communication device not sending the indication indicating "RRC connection failure" to the MM layer in response to the cell selection/reselection, when the communication device performs the cell selection/reselection to the second cell and the second cell supports the RRC_INACTIVE state.

18. The communication device of claim 10, wherein the instructions further comprise:

not initiating a tracking area update procedure, when the second cell indicates that the second cell supports the RRC_INACTIVE state in system information and the first cell and the second cell belong to a same tracking area; and initiating the tracking area update procedure, when the second cell indicates that the second cell does not support the RRC_INACTIVE state in the system information.

19. The communication device of claim 10, wherein the RRC layer is an evolved universal terrestrial radio access (E-UTRA) RRC layer or a new radio (NR) RRC layer.

* * * * *